United States Patent
Huang et al.

(10) Patent No.: US 10,634,565 B2
(45) Date of Patent: Apr. 28, 2020

(54) TEMPERATURE SENSING APPARATUS AND TEMPERATURE SENSING METHOD THEREOF

(71) Applicant: Nuvoton Technology Corporation, Hsinchu (TW)

(72) Inventors: Shih-Feng Huang, Hsinchu (TW); Jia-Yan Su, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 231 days.

(21) Appl. No.: 15/828,290

(22) Filed: Nov. 30, 2017

(65) Prior Publication Data
US 2018/0156671 A1    Jun. 7, 2018

(30) Foreign Application Priority Data
Dec. 1, 2016   (TW) .............................. 105139629 A

(51) Int. Cl.
| | |
|---|---|
| G01K 7/00 | (2006.01) |
| G01K 7/24 | (2006.01) |
| H01C 1/14 | (2006.01) |
| G01K 3/00 | (2006.01) |
| G01K 7/01 | (2006.01) |

(52) U.S. Cl.
CPC .............. *G01K 7/24* (2013.01); *G01K 3/005* (2013.01); *G01K 7/01* (2013.01); *H01C 1/1413* (2013.01)

(58) Field of Classification Search
USPC .......................... 374/183, 163, 178; 327/512
See application file for complete search history.

(56) References Cited

U.S. PATENT DOCUMENTS

| | | | |
|---|---|---|---|
| 3,420,104 A | 1/1969 | Troemel et al. | |
| 3,722,283 A | 3/1973 | Treharne et al. | |
| 6,342,997 B1 | 1/2002 | Khadkikar et al. | |
| 7,844,764 B2 | 11/2010 | Williams | |
| 8,727,616 B2 * | 5/2014 | Snowdon | G01K 7/22 374/178 |
| 2014/0219316 A1 * | 8/2014 | Tashiro | G01K 7/22 374/185 |

FOREIGN PATENT DOCUMENTS

| | | |
|---|---|---|
| TW | I424441 | 1/2014 |
| TW | I434032 | 4/2014 |

* cited by examiner

*Primary Examiner* — Mirellys Jagan
(74) *Attorney, Agent, or Firm* — JCIPRNET

(57) ABSTRACT

A temperature sensing apparatus and a temperature sensing method thereof are provided. A current source circuit provides a test current to a temperature sensing load, and the temperature sensing load generates a test voltage in response to the test current. A processing circuit determines a type of the temperature sensing load according to the test voltage, and determines a temperature according to the type of the temperature sensing load and a temperature sensing voltage generated by the temperature sensing load.

8 Claims, 4 Drawing Sheets

TEMPERATURE SENSING APPARATUS AND TEMPERATURE SENSING METHOD THEREOF

CROSS-REFERENCE TO RELATED APPLICATION

This application claims the priority benefit of Taiwan application serial no. 105139629, filed on Dec. 1, 2016. The entirety of the above-mentioned patent application is hereby incorporated by reference herein and made a part of this specification.

BACKGROUND OF THE INVENTION

Field of the Invention

The invention relates to a sensing apparatus, and more particularly to a temperature sensing apparatus and a temperature sensing method thereof.

Description of Related Art

A temperature sensor is an electronic apparatus which converts a temperature into digital information, and is widely applied in various electronic equipment.

There are various types of temperature sensors. For example, a semiconductor type temperature sensor measures an environmental temperature by use of a thermistor having a negative temperature coefficient or a positive temperature coefficient (i.e., being inversely or directly proportional to an absolute temperature). That is, the semiconductor type temperature sensor performs temperature sensing by variation in voltages generated by the thermistor in response to the temperature. Alternatively, temperature information is obtained by utilizing a characteristic of a diode device that a conduction voltage of the diode device changes with temperature. Although the different types of temperature sensors all show their measured temperature information by electrical signals, since the characteristic of varying with temperature differs between different temperature measurement devices, the temperature sensors must be designed according to the temperature measurement devices having different characteristics, so as to prevent a situation in which a temperature sensing chip erroneously interprets an electrical signal provided by the temperature measurement device and an inaccurate temperature measurement result is thus obtained.

SUMMARY OF THE INVENTION

The invention provides a temperature sensing apparatus and a temperature sensing method thereof capable of automatically performing a temperature measurement according to a type of a temperature sensing load so as to obtain an accurate temperature measurement result.

The temperature sensing apparatus of the invention includes a current source circuit and a processing circuit. The current source circuit is coupled to a sensing voltage input terminal of the temperature sensing apparatus. The sensing voltage input terminal is configured to be coupled to a temperature sensing load. The current source circuit provides a test current to the temperature sensing load. The temperature sensing load generates a test voltage to the sensing voltage input terminal in response to the test current. The processing circuit is coupled to the current source circuit and the sensing voltage input terminal, determines a type of the temperature sensing load according to the test voltage, and determines a temperature according to the type of the temperature sensing load and a temperature sensing voltage generated by the temperature sensing load.

In an embodiment of the invention, the temperature sensing load is coupled between the sensing voltage input terminal and a ground. The temperature sensing load is a thermistor or a temperature sensing diode. The temperature sensing apparatus further includes a reference voltage source and a resistor. The reference voltage source is coupled to the processing circuit. The resistor is coupled between an output terminal of the reference voltage source and the sensing voltage input terminal, wherein when the processing circuit determines that the temperature sensing load is the thermistor according to the test voltage, the processing circuit controls the current source circuit to stop outputting a current, and controls the reference voltage source to output a reference voltage, so as to generate the temperature sensing voltage at a common node of the resistor and the thermistor, and when the processing circuit determines that the temperature sensing load is the temperature sensing diode according to the test voltage, the processing circuit disables the reference voltage source and controls the current source circuit to generate an operation current to the temperature sensing diode, so that the temperature sensing diode generates the temperature sensing voltage in response to the operation current.

In an embodiment of the invention, the current source circuit includes a first variable current source, a second variable current source and a multiplexer. The first variable current source generates the test current. The second variable current source generates the operation current. The multiplexer is coupled to the processing circuit, the first variable current source and the second variable current source, and is controlled by the processing circuit to determine whether or not to output the test current or the operation current to the temperature sensing load.

In an embodiment of the invention, the operation current is greater than the test current.

In an embodiment of the invention, the temperature sensing apparatus further includes an amplification circuit, coupled between the processing circuit and the sensing voltage input terminal and performing signal amplification on the test voltage and the temperature sensing voltage.

The invention also provides a temperature sensing method of a temperature sensing apparatus, the temperature sensing method including the following steps. A test current is provided to a temperature sensing load, so as to make the temperature sensing load generate a test voltage to a sensing voltage input terminal of the temperature sensing apparatus in response to the test current. A type of the temperature sensing load is determined according to the test voltage. A temperature is determined according to the type of the temperature sensing load and a temperature sensing voltage generated by the temperature sensing load.

In an embodiment of the invention, the temperature sensing load is coupled between the sensing voltage input terminal and a ground, and the temperature sensing load is a thermistor or a temperature sensing diode, wherein if the temperature sensing load is the thermistor, a reference voltage is outputted to the thermistor, so as to generate the temperature sensing voltage; if the temperature sensing load is the temperature sensing diode, an operation current is provided to the temperature sensing diode, so as to make the temperature sensing diode generate the temperature sensing voltage in response to the operation current.

In an embodiment of the invention, the operation current is greater than the test current.

Based on the above, in the embodiments of the invention, the current source circuit provides the test current to the temperature sensing load, so that the temperature sensing load generates the test voltage in response to the test current. The processing circuit determines the type of the temperature sensing load according to the test voltage, and determines the temperature according to the type of the temperature sensing load and the temperature sensing voltage generated by the temperature sensing load, so as to obtain an accurate temperature measurement result.

To make the above features and advantages of the invention more comprehensible, embodiments accompanied with drawings are described in detail as follows.

DETAILED DESCRIPTION OF DISCLOSED EMBODIMENTS

Figure 1:
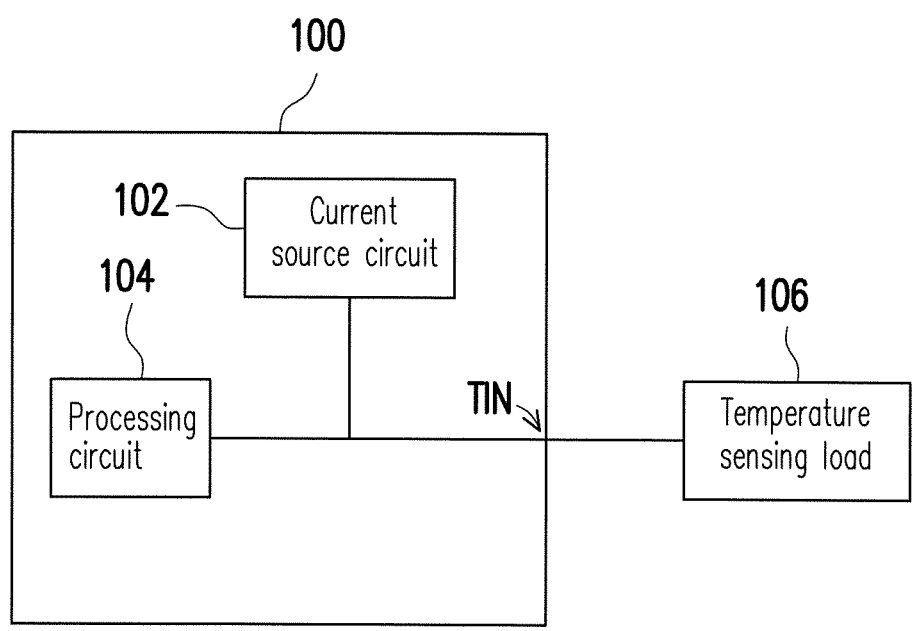
FIG. 1 is a schematic view of a temperature sensing apparatus according to an embodiment of the invention.

FIG. 1 is a schematic view of a temperature sensing apparatus according to an embodiment of the invention. Referring to FIG. 1, a temperature sensing apparatus 100 is, for example, a temperature sensing chip, and includes a current source circuit 102 and a processing circuit 104, wherein the current source circuit 102 is coupled to a sensing voltage input terminal TIN of the temperature sensing apparatus 100, and the sensing voltage input terminal TIN is configured to be coupled to a temperature sensing load 106. The current source circuit 102 provides a test current to the temperature sensing load 106, so that the temperature sensing load 106 generates a test voltage to the sensing voltage input terminal TIN in response to the test current. The processing circuit 104 is coupled to the current source circuit 102 and the sensing voltage input terminal TIN. The processing circuit 104 determines a type of the temperature sensing load 106 according to the test voltage outputted by the temperature sensing load 106 in response to the test current, and, according to the type of the temperature sensing load 106 and a temperature sensing voltage generated by the temperature sensing load 106 by sensing an environmental temperature, determines a temperature corresponding to the temperature sensing voltage.

In this way, by outputting the test current to the temperature sensing load 106 and by determining the type of the temperature sensing load 106 according to the test voltage outputted by the temperature sensing load 106 in response to the test current, the processing circuit 104 accurately interprets the temperature sensing voltage provided by the temperature sensing load 106 according to device characteristics of the temperature sensing load 106, thereby obtaining an accurate temperature measurement result.

Figure 2:
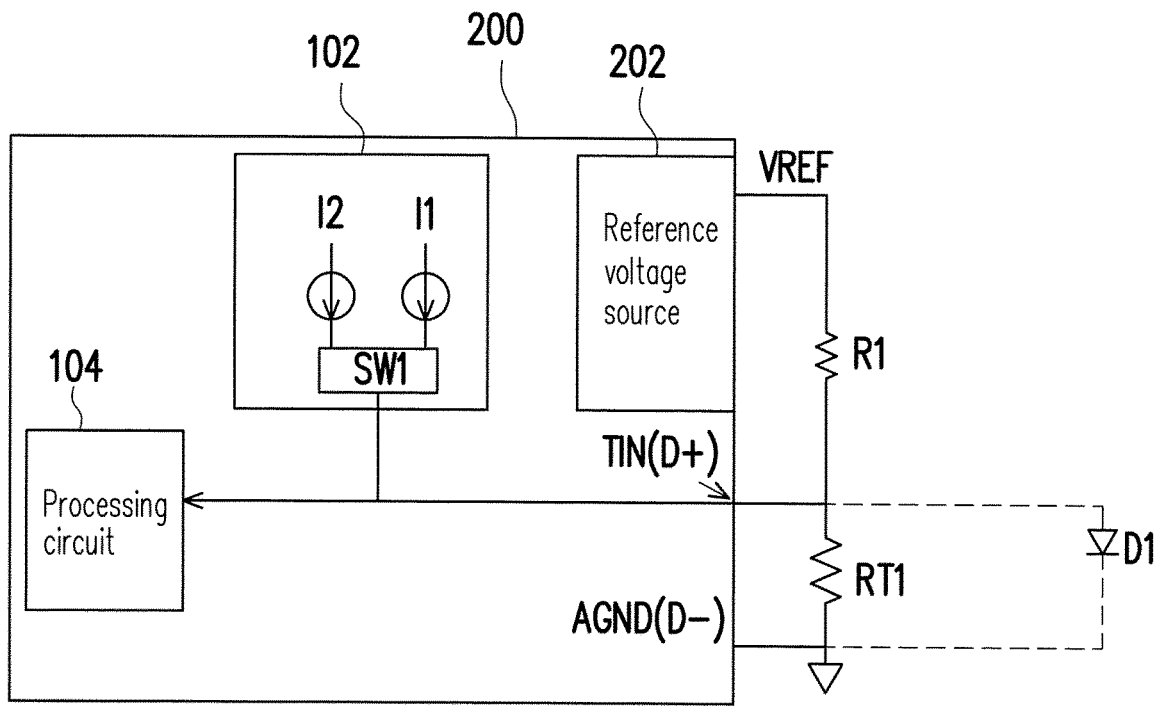
FIG. 2 is a schematic view of a temperature sensing apparatus according to another embodiment of the invention.

FIG. 2 is a schematic view of a temperature sensing apparatus according to another embodiment of the invention. Referring to FIG. 2, in detail, the temperature sensing load 106 is implemented as, for example but not limited to, a thermistor RT1 or a temperature sensing diode D1 shown in FIG. 2. When the thermistor RT1 or the temperature sensing diode D1 is used as the temperature sensing load 106, the thermistor RT1 or the temperature sensing diode D1 is coupled between the sensing voltage input terminal TIN and a ground pin AGND of a temperature sensing apparatus 200 (wherein the sensing voltage input terminal TIN and the ground pin AGND are respectively used as differential signal pins D+ and D− of the temperature sensing apparatus 200). In addition, in the present embodiment, the temperature sensing apparatus 200 further includes a reference voltage source 202 and a resistor R1, wherein the reference voltage source 202 is connected to a reference voltage pin VREF of the temperature sensing apparatus 200, and the resistor R1 is coupled between the reference voltage source 202 and the sensing voltage input terminal TIN. In the present embodiment, the resistor R1 is arranged outside the temperature sensing apparatus 200. However, the invention is not limited thereto. In some embodiments, the resistor R1 may be arranged inside the temperature sensing apparatus 200. In the present embodiment, the current source circuit 102 is implemented as, for example, two current sources I1 and I2 and a switch circuit SW1, wherein the switch circuit SW1 is coupled to the current sources I1 and I2, the processing circuit 104 and the sensing voltage input terminal TIN.

The processing circuit 104 controls the switch circuit SW1 to connect at least one of the current sources I1 and I2 to the sensing voltage input terminal TIN, so as to provide the test current to the temperature sensing load 106 (e.g., the thermistor RT1 or the temperature sensing diode D1), so that the temperature sensing load 106 provides the test voltage to the sensing voltage input terminal TIN in response to the test current. According to the test voltage, the processing circuit 104 determines the type of the temperature sensing load 106, wherein different types of temperature sensing loads 106 generate different test voltages in response to the temperature. For example, the test voltage provided by the thermistor RT1 is approximately 0.1 V, and the test voltage provided by the temperature sensing diode D1 is approximately 0.5 V to 0.7 V.

For example, when the processing circuit 104 determines that the temperature sensing load 106 is the thermistor RT1 according to the test voltage, the processing circuit 104 controls the switch circuit SW1 to disconnect the current sources I1 and I2 from the sensing voltage input terminal TIN, so as to stop the current source circuit 102 from outputting a current. The processing circuit 104 also controls the reference voltage source 202 to output a reference voltage to the sensing voltage input terminal TIN through the reference voltage pin VREF, so as to generate the temperature sensing voltage at a common node of the resistor R1 and the thermistor RT1, so that the processing circuit 104 determines the environmental temperature sensed by the thermistor RT1 according to the temperature sensing voltage.

In addition, if the processing circuit 104 determines that the temperature sensing load 106 is the temperature sensing diode D1 according to the test voltage, the processing circuit 104 disables the reference voltage source 202 from outputting the reference voltage. Moreover, the switch circuit SW1 connects at least one of the current sources I1 and I2 to the sensing voltage input terminal TIN, so as to control the current source circuit 102 to generate an operation current to the temperature sensing diode D1, so that the temperature sensing diode D1 generates the temperature sensing voltage in response to the operation current. In this way, the processing circuit 104 determines the environmental temperature sensed by the temperature sensing diode D1 according to the temperature sensing voltage. It is worth noting that, generally, the current (i.e., the test current, which is for example but not limited to, 1 μA to 5 μA) for being provided to the temperature sensing load 106 in testing the type of the temperature sensing load 106 is less than the current (i.e., the operation current) for being provided for performing temperature sensing. Thus, the current sources I1 and I2 have different current output magnitudes, and the magnitude of the current outputted to the temperature sensing load 106 is adjusted by controlling a conduction state of the switch circuit SW1. For example, when testing the type of the temperature sensing load 106, the current source that outputs a smaller current is connected to the sensing voltage input terminal TIN; alternatively, when measuring the temperature, the current sources I1 and I2 are both connected to the sensing voltage input terminal TIN. However, the invention is not limited thereto. In some embodiments, the test current may be the same as or greater than the operation current.

It is worth noting that, in some embodiments, the sensing voltage input terminal TIN may not be connected to any temperature sensing load 106. At this moment, the voltage sensed by the processing circuit 104 may be a power voltage of the current sources I1 and I2. In other embodiments, a short circuit may occur in the sensing voltage input terminal TIN. At this moment, the voltage sensed by the processing circuit 104 may be a ground voltage, or a system voltage of an electronic apparatus applying the temperature sensing apparatus. Since the short circuit in the sensing voltage input terminal TIN is an abnormal situation, at this moment, the processing circuit 104 outputs a notification message to the electronic apparatus applying the temperature sensing apparatus so as to make the electronic apparatus take a necessary safety measure, such as shutting down.

Figure 3:
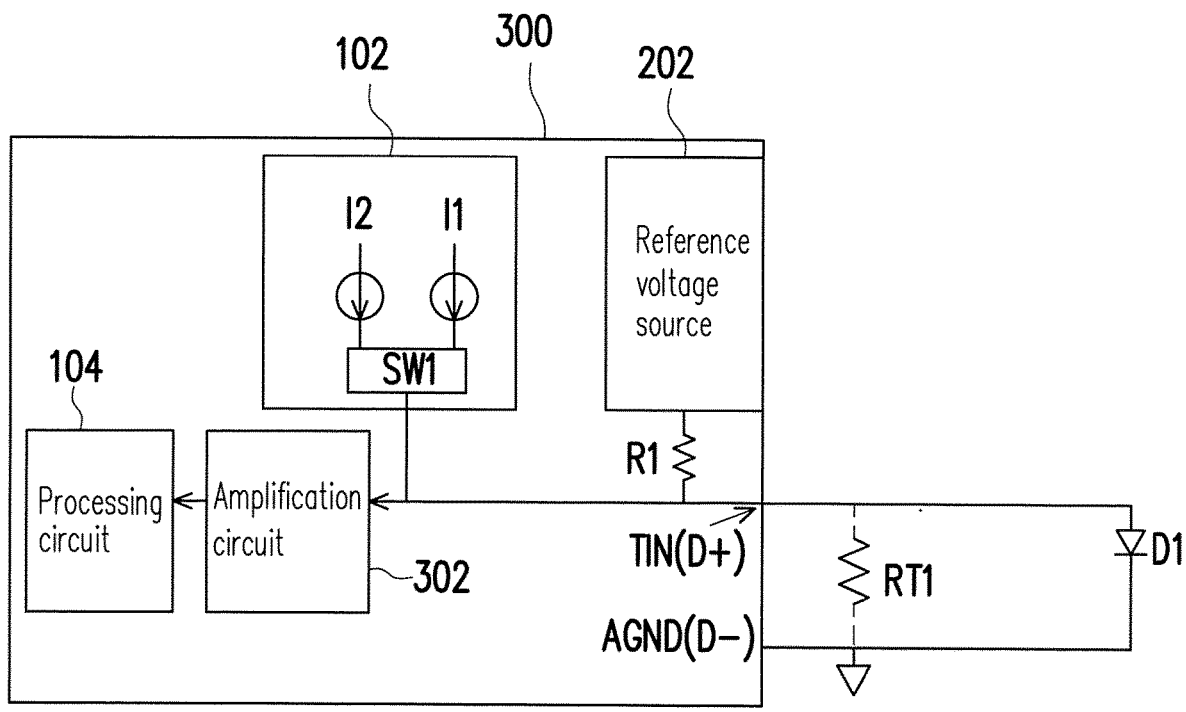
FIG. 3 is a schematic view of a temperature sensing apparatus according to another embodiment of the invention.

FIG. 3 is a schematic view of a temperature sensing apparatus according to another embodiment of the invention. Referring to FIG. 3, a temperature sensing apparatus 300 of the present embodiment differs from the temperature sensing apparatus 200 in FIG. 2 in that, the temperature sensing apparatus 300 of the present embodiment further includes an amplification circuit 302 coupled between the processing circuit 104 and the sensing voltage input terminal TIN. The amplification circuit 302 amplifies the test voltage and the temperature sensing voltage from the temperature sensing load 106, and provides the test voltage and the temperature sensing voltage to the processing circuit 104 for signal processing such as an analog-to-digital conversion of signals, temperature determination and so on. Moreover, the resistor R1 of the present embodiment is arranged inside the temperature sensing apparatus 300. In addition, FIG. 3 also exemplifies the case where the temperature sensing load 106 is the temperature sensing diode D1 or the thermistor RT1.

Figure 4:
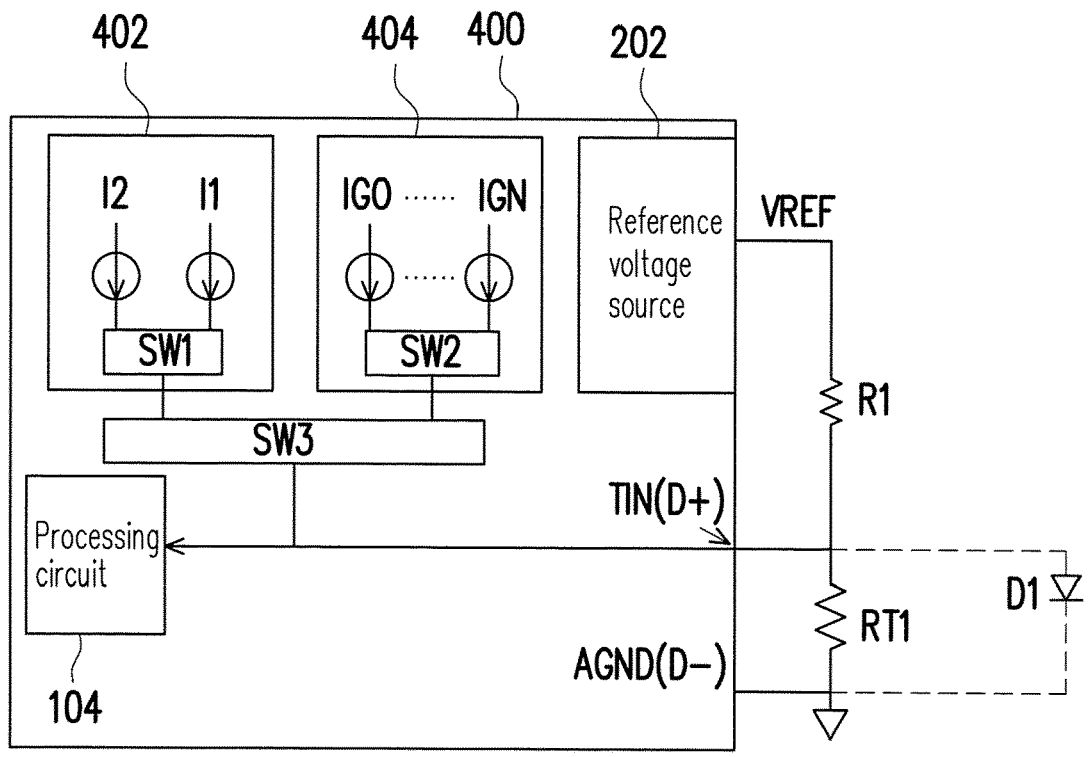
FIG. 4 is a schematic view of a temperature sensing apparatus according to another embodiment of the invention.

FIG. 4 is a schematic view of a temperature sensing apparatus according to another embodiment of the invention. Referring to FIG. 4, a temperature sensing apparatus 400 of the present embodiment differs from the temperature sensing apparatus 200 in FIG. 2 in that, in the present embodiment, a current source circuit of the temperature sensing apparatus 400 includes a variable current source 402, a variable current source 404 and a switch circuit SW3, wherein the variable current source 402 is implemented as, for example, the current source circuit 102 in FIG. 2. In addition, the variable current source 404 includes a plurality of current sources IG0 to IGN and a switch circuit SW2, wherein the switch circuit SW2 is coupled between the current sources IG0 to IGN and the switch circuit SW3, and the switch circuit SW3 is coupled between the switch circuits SW1 and SW2 and the sensing voltage input terminal TIN. As described above, the current (i.e., the test current) for being provided to the temperature sensing load 106 in testing the type of the temperature sensing load 106 is less than the current (i.e., the operation current) for being provided for performing temperature sensing. In the present embodiment, the two variable current sources 402 and 404 respectively provide the operation current and the test current. For example, the variable current source 402 provides the operation current, and the variable current source 404 provides the test current. However, the invention is not limited thereto. Moreover, according to the characteristic (i.e., the test current and the operation current for different temperature sensing loads may be different) of the temperature sensing load 106, the variable current sources 402 and 404 adjust the magnitudes of the test current and the operation current by controlling the conduction state of the switch circuits SW1 and SW2 by the processing circuit 104. Accordingly, the temperature sensing apparatus 400 is applicable to more types of temperature sensing loads 106 having different characteristics. In addition, the switch circuit SW3 is configured to provide the operation current or the test current to the temperature sensing load 106, or to not provide the operation current or the test current to the temperature sensing load 106.

Figure 5:
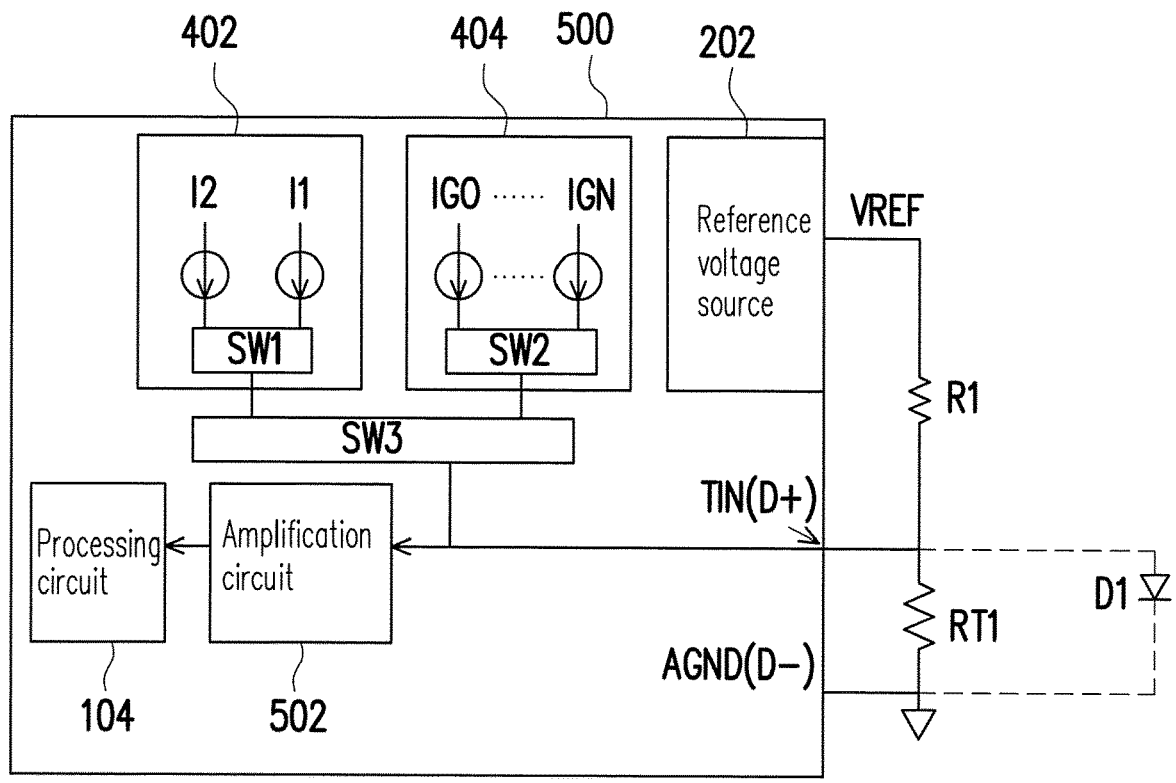
FIG. 5 is a schematic view of a temperature sensing apparatus according to another embodiment of the invention.

FIG. 5 is a schematic view of a temperature sensing apparatus according to another embodiment of the invention. Referring to FIG. 5, a temperature sensing apparatus 500 of the present embodiment differs from the temperature sensing apparatus 400 in FIG. 4 in that, the temperature sensing apparatus 500 of the present embodiment further includes an amplification circuit 502 coupled between the processing circuit 104 and the sensing voltage input terminal TIN. The amplification circuit 502 amplifies the test voltage and the temperature sensing voltage from the temperature sensing load 106, and provides the test voltage and the temperature sensing voltage to the processing circuit 104 for signal processing such as an analog-to-digital conversion of signals, temperature determination and so on. The temperature sensing apparatus of the above embodiments is applied in, for example, detecting a temperature of a chip inside a computer, so as to perform relevant temperature control operations. For example, a heat dissipation apparatus (e.g., a fan) is controlled to perform heat dissipation according to a temperature sensing result provided by the temperature sensing apparatus, so as to accurately control the temperature of the chip inside the computer, thus preventing the chip from overheat which may affect operation performance or safety of the computer. It is worth noting that, the temperature sensing apparatus is applicable to, for example, other apparatuses requiring an accurate temperature sensing function. The temperature sensing apparatus may not only be applied in a computer, but may be applied in, for example, temperature control of a server.

Figure 6:
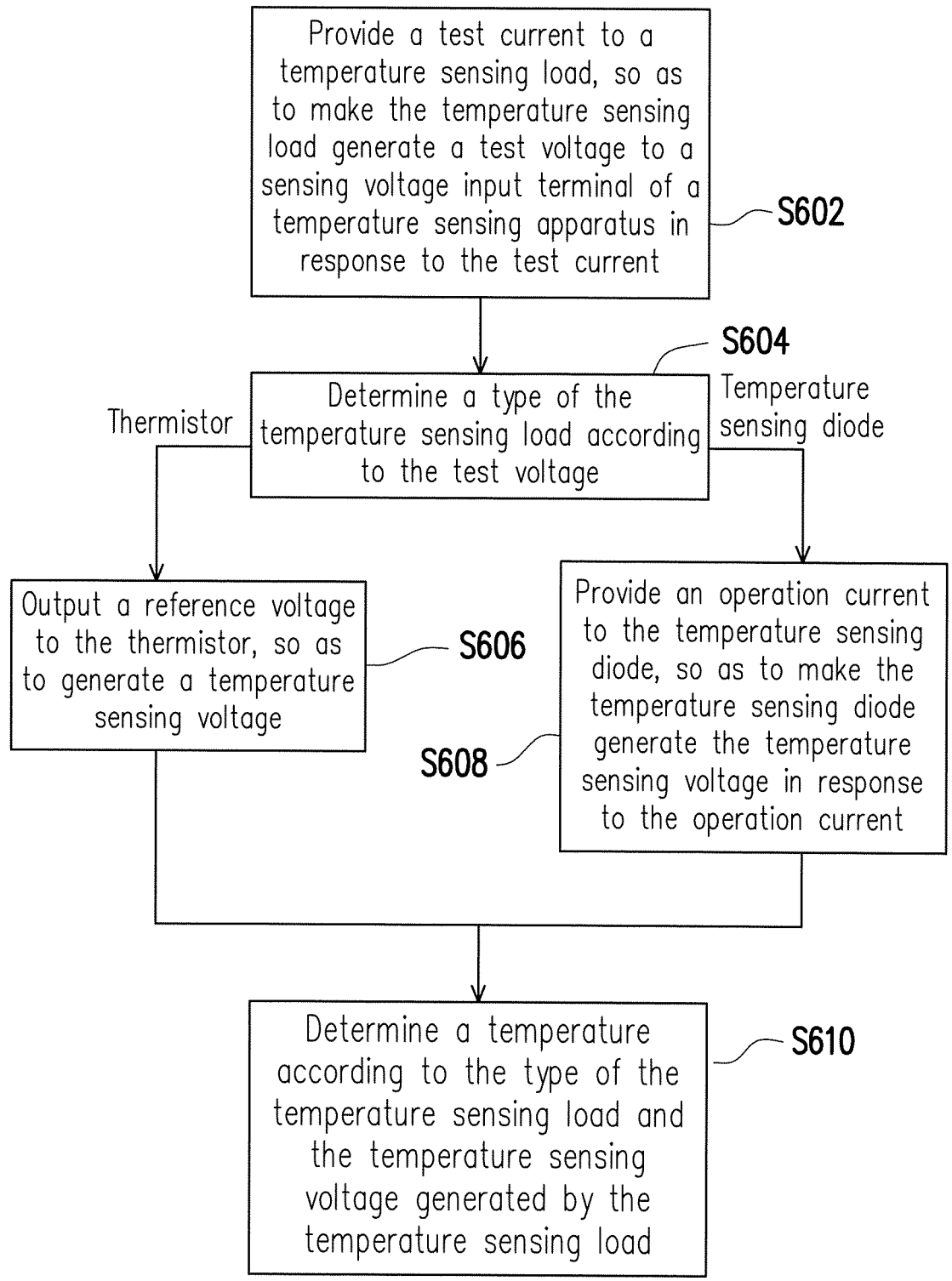
FIG. 6 is a schematic flowchart of a temperature sensing method of a temperature sensing apparatus according to an embodiment of the invention.

FIG. 6 is a schematic flowchart of a temperature sensing method of a temperature sensing apparatus according to an embodiment of the invention. Referring to FIG. 6, it is known from the above embodiments that the temperature sensing method of a temperature sensing apparatus includes the following steps. First of all, a test current is provided to a temperature sensing load, so as to make the temperature sensing load generate a test voltage to a sensing voltage input terminal of the temperature sensing apparatus in response to the test current (step S602). Next, a type of the temperature sensing load is determined according to the test voltage (step S604), wherein the temperature sensing load is, for example, a thermistor or a temperature sensing diode. For example, if it is determined that the temperature sensing load is a thermistor, a reference voltage is outputted to the thermistor, so as to generate a temperature sensing voltage (step S606); if it is determined that the temperature sensing load is a temperature sensing diode, an operation current is provided to the temperature sensing diode, so as to make the temperature sensing diode generate the temperature sensing voltage in response to the operation current (step S608), wherein a magnitude of the test current is not limited as long as the test current is distinguishable from the operation current, and a processing circuit may determine the type of the temperature sensing load. In the present embodiment, the operation current is greater than the test current. Finally, a temperature is determined according to the type of the temperature sensing load and the temperature sensing voltage generated by the temperature sensing load (step S610).

In summary, in the embodiments of the invention, by outputting the test current to the temperature sensing load and by determining the type of the temperature sensing load according to the test voltage outputted by the temperature sensing load in response to the test current, the processing circuit accurately interprets the temperature sensing voltage provided by the temperature sensing load according to device characteristics of the temperature sensing load, so as to obtain an accurate temperature measurement result. In some embodiments, the current source circuit of the temperature sensing apparatus includes the variable current source configured to provide the operation current, and the variable current source configured to provide the test current. By the current sources providing the currents having different functions, the type of the temperature sensing load is effectively and accurately determined. In addition, in performing temperature sensing, a sufficient current is provided for performing the temperature sensing operation, and an accurate temperature measurement result can be reliably obtained.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A temperature sensing apparatus, comprising:
    a current source circuit, coupled to a sensing voltage input terminal of the temperature sensing apparatus, the sensing voltage input terminal being configured to be coupled to a temperature sensing load, the current source circuit providing a test current to the temperature sensing load, the temperature sensing load generating a test voltage to the sensing voltage input terminal in response to the test current; and
    a processing circuit, coupled to the current source circuit and the sensing voltage input terminal, determining a type of the temperature sensing load according to the test voltage provided from the temperature sensing load, and determining an environmental temperature according to the type of the temperature sensing load and a temperature sensing voltage generated by the temperature sensing load,
    wherein when the temperature sensing load is a thermistor, the processing circuit determines the environmental temperature sensed by the thermistor according to the temperature sensing voltage, and when the temperature sensing load is a temperature sensing diode, the processing circuit determines the environmental temperature sensed by the temperature sensing diode according to the temperature sensing voltage.

2. The temperature sensing apparatus according to claim 1, further comprising:
    an amplification circuit, coupled between the processing circuit and the sensing voltage input terminal, and performing signal amplification on the test voltage and the temperature sensing voltage.

3. The temperature sensing apparatus according to claim 1, wherein the temperature sensing load is coupled between the sensing voltage input terminal and a ground, and the temperature sensing apparatus further comprises:
    a reference voltage source, coupled to the processing circuit; and
    a resistor, coupled between an output terminal of the reference voltage source and the sensing voltage input terminal, wherein when the processing circuit determines that the temperature sensing load is the thermistor according to the test voltage, the processing circuit controls the current source circuit to stop outputting a current, and controls the reference voltage source to output a reference voltage, so as to generate the temperature sensing voltage at a common node of the resistor and the thermistor, and when the processing circuit determines that the temperature sensing load is the temperature sensing diode according to the test voltage, the processing circuit disables the reference voltage source and controls the current source circuit to generate an operation current to the temperature sensing diode, so that the temperature sensing diode generates the temperature sensing voltage in response to the operation current.

4. The temperature sensing apparatus according to claim 3, wherein the current source circuit comprises:
    a first variable current source, generating the test current;
    a second variable current source, generating the operation current; and
    a multiplexer, coupled to the processing circuit, the first variable current source and the second variable current source, and controlled by the processing circuit to determine whether or not to output the test current or the operation current to the temperature sensing load.

5. The temperature sensing apparatus according to claim 3, wherein the operation current is greater than the test current.

6. A temperature sensing method of a temperature sensing apparatus, comprising:
    providing a test current to a temperature sensing load, so as to make the temperature sensing load generate a test voltage to a sensing voltage input terminal of the temperature sensing apparatus in response to the test current;
    determining a type of the temperature sensing load according to the test voltage provided from the temperature sensing load; and determining an environmental temperature according to the type of the temperature sensing load and a temperature sensing voltage generated by the temperature sensing load, wherein when the temperature sensing load is a thermistor, the processing circuit determines the environmental temperature sensed by the thermistor according to the temperature sensing voltage, and when the temperature sensing load is a temperature sensing diode, the processing circuit determines the environmental temperature sensed by the temperature sensing diode according to the temperature sensing voltage.

7. The temperature sensing method of a temperature sensing apparatus according to claim 6, wherein the temperature sensing load is coupled between the sensing voltage input terminal and a ground, and wherein the temperature sensing method comprises: if the temperature sensing load is the thermistor, outputting a reference voltage to the thermistor, so as to generate the temperature sensing voltage; and if the temperature sensing load is the temperature sensing diode, providing an operation current to the temperature sensing diode, so as to make the temperature sensing diode generate the temperature sensing voltage in response to the operation current.

8. The temperature sensing method of a temperature sensing apparatus according to claim 7, wherein the operation current is greater than the test current.

\* \* \* \* \*